United States Patent
Uchikawa et al.

[11] Patent Number: 5,974,891
[45] Date of Patent: Nov. 2, 1999

[54] ULTRASONIC WAVE DIAGNOSTIC APPARATUS WITH BEAM CONVERGENCE AND CLOCK SIGNAL SELECTION

[75] Inventors: Akiko Uchikawa; Hisashi Akiyama, both of Yokohama, Japan

[73] Assignee: Matsushita Electric Industrial Co., Ltd., Osaka, Japan

[21] Appl. No.: 08/850,518

[22] Filed: May 2, 1997

[30] Foreign Application Priority Data

Jul. 22, 1996 [JP] Japan ................................ 8-191901

[51] Int. Cl.⁶ .............................. G01N 24/00; A61B 8/00
[52] U.S. Cl. .............................................. 73/625; 600/447
[58] Field of Search ......................... 73/625, 626, 633; 600/437, 447; 327/152

[56] References Cited

U.S. PATENT DOCUMENTS

| | | |
|---|---|---|
| 4,611,494 | 9/1986 | Uchiyama . |
| 4,841,492 | 6/1989 | Russell ..................... 73/626 |
| 4,870,971 | 10/1989 | Russell ..................... 73/625 |
| 5,415,172 | 5/1995 | Tannaka .................. 600/437 |

FOREIGN PATENT DOCUMENTS 62-180267  8/1987  Japan .
B696016   12/1987  Japan .

*Primary Examiner*—Hezron Williams
*Assistant Examiner*—Helen C. Kwok
*Attorney, Agent, or Firm*—Stevens, Davis, Miller & Mosher, L.L.P.

[57] ABSTRACT

A simple, compact and inexpensive ultrasonic wave diagnostic apparatus of electronic focus type in which the delay amount for controlling the phase of a transmission signal for each piezoelectric element is stored in a delay amount storage unit, the pulse width for controlling the frequency of the transmission signal for each piezoelectric element is stored in a pulse width storage unit, the time elapsed from a reference time point is counted by a counter, a change point of the transmission signal from the reference time point is calculated by a processor, the output of the processor is compared with the output of the counter by a comparator, a plurality of clock signals having different phases are generated by a multiphase clock generator, a clock generated by the multiphase clock signal generator is selected by a selective controller, and a pulse of the transmission signal is generated on the basis of the selected clock by a toggle circuit. The delay amount, the duty factor and the frequency of the transmission signal are controlled for each piezoelectric element to converge the ultrasonic wave beam, thereby making possible a highly accurate diagnosis with high image quality.

4 Claims, 6 Drawing Sheets

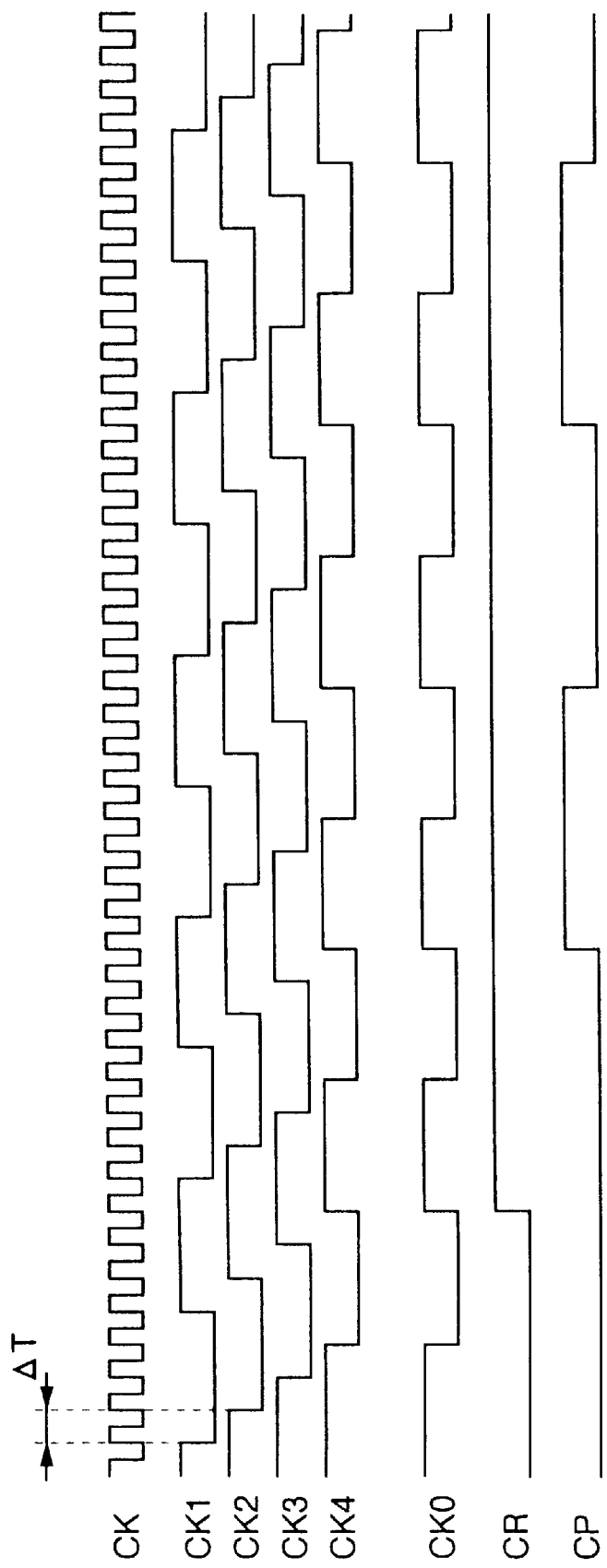

ULTRASONIC WAVE DIAGNOSTIC APPARATUS WITH BEAM CONVERGENCE AND CLOCK SIGNAL SELECTION

BACKGROUND OF THE INVENTION

1. Field of the Invention

The present invention relates to an ultrasonic wave diagnostic apparatus or more particularly to an ultrasonic wave diagnostic apparatus of electronic focus type in which an ultrasonic beam is converged by controlling the phase of a signal transmitted from a plurality of piezoelectric elements.

2. Description of the Related Art

In conventional ultrasonic wave diagnostic apparatuses of electronic focus type, the ultrasonic wave beam is converged or deflected by displacing the transmission time of the ultrasonic waves from a plurality of piezoelectric elements and thus controlling the focus of the transmitted waves.

A first conventional ultrasonic wave diagnostic apparatus of this type is disclosed in JP-A-62-277944 (JP-B-6-96016). FIG. 5 shows a configuration of an ultrasonic transmission wave focus control circuit of the conventional ultrasonic wave diagnostic apparatus, and FIG. 6 is a timing chart of an output waveform of the apparatus. The conventional ultrasonic wave diagnostic apparatus, as shown in FIGS. 5 and 6, comprises a delayed clock generating circuit 51 for generating multiphase delayed clock signals CK1 to CK4 and controlling the delay amount of ΔT, a delayed data latch circuit 52 for storing the delay time, a multiplexer 53 for selecting one clock CK0 signal (CK4 in FIG. 6) from the delayed clock signals CK1 to CK4, a delay amount counter 54 for counting the delayed clock signals and determining the delay amount, a transmission wave pulse counter 55 for counting the number of transmission pulses, and a transmission wave pulse generating circuit 56 for generating transmission pulses.

In the conventional ultrasonic wave diagnostic apparatus having the above-mentioned configuration, an output DS of the delayed data latch circuit 52 is counted by the delay amount counter 54 and a signal CR is output. After this signal CR rises, a transmission pulse CP for generating an ultrasonic wave is produced thereby to control the delay amount.

In a second conventional ultrasonic wave diagnostic apparatus suggested in JP-A-62-180267, on the other hand, an oscillation circuit is configured of at least a resistor and at least a capacitor, and the frequency of the transmission pulses is controlled by setting the characteristic values of the resistor and the capacitor.

According to the first conventional ultrasonic wave diagnostic apparatus above mentioned, however, the transmission pulses output from the transmission pulse generating circuit 56 has a frequency obtained by dividing the frequency of the delayed clock signal. For controlling the frequency and the duty factor of the transmission pulses, therefore, an additional circuit is required.

According to the second conventional ultrasonic wave diagnostic apparatus described above, on the other hand, there is a problem that the constants of the resistor and the capacitor are required to be changed for setting the frequency, and therefore there are required resistors and capacitors corresponding to the frequency involved, resulting in the circuit scale being increased in accordance with a number of operating frequencies of the transmission pulses. Further, the dependence of the frequency on the characteristic values of the resistors and the capacitors makes impossible a highly accurate setting. The frequency, therefore, cannot be finely adjusted.

SUMMARY OF THE INVENTION

An object of the present invention is to solve the above-mentioned problems and to provide an ultrasonic wave diagnostic apparatus which can perform stable diagnosis with high accuracy and high image quality, and in which an ultrasonic wave transmission focus control circuit is realized with a simple, small and inexpensive configuration.

In order to achieve the above-mentioned object, there is provided an ultrasonic wave diagnostic apparatus in which the count value representing the lapse of the time from a reference time point is compared with a delay amount determining the timing of reversing the transmission signal output or with the sum of the delay amount and accumulated pulse widths, and the transmission signal output is reversed at the time of coincidence between the count value and the delay amount or the sum, as the case may be.

According to one aspect of the invention, there is provided an ultrasonic wave diagnostic apparatus comprising a plurality of piezoelectric elements 9 each for generating an ultrasonic wave in response to a transmission signal applied thereto, delay amount storage means 1 for storing the delay amount used to control the phase of the transmission signal for respective one of the piezoelectric elements, pulse width storage means 2 for storing the pulse width used to control the frequency of the transmission signal for respective one of the piezoelectric elements, measurement means 3 for receiving a reference time signal representing a reference time point and measuring the time elapsed from the reference time point, calculation means 4 for determining a change point of the transmission signal on the basis of the delay amount stored in the delay amount storage means, the pulse width stored in the pulse width storage means and the reference time signal, a comparator 5 for comparing an output of the calculation means with an output of the measurement means, a multiphase clock generator 6 for generating a plurality of clock signals having different phases, selection means 7 for selecting one of the clock signals generated by the multiphase clock generator in accordance with the output of the calculation means in the case where an output of the comparator exhibits a predetermined state, and a circuit 8 for generating the transmission signal on the basis of the one of the clock signals selected by the selection means.

As a result, the ultrasonic wave beam can be converged by controlling the delay amount of the transmission signal, the frequency and the duty factor for each piezoelectric element, thereby realizing an image of high quality and high accuracy with stable characteristics.

BRIEF DESCRIPTION OF THE DRAWINGS

FIG. 6 is a timing chart representing the operation of the conventional ultrasonic wave diagnostic apparatus.

DESCRIPTION OF THE PREFERRED EMBODIMENTS

Embodiments of the present invention will be described below with reference to the accompanying drawings.

(Embodiment 1)

Figure 1:
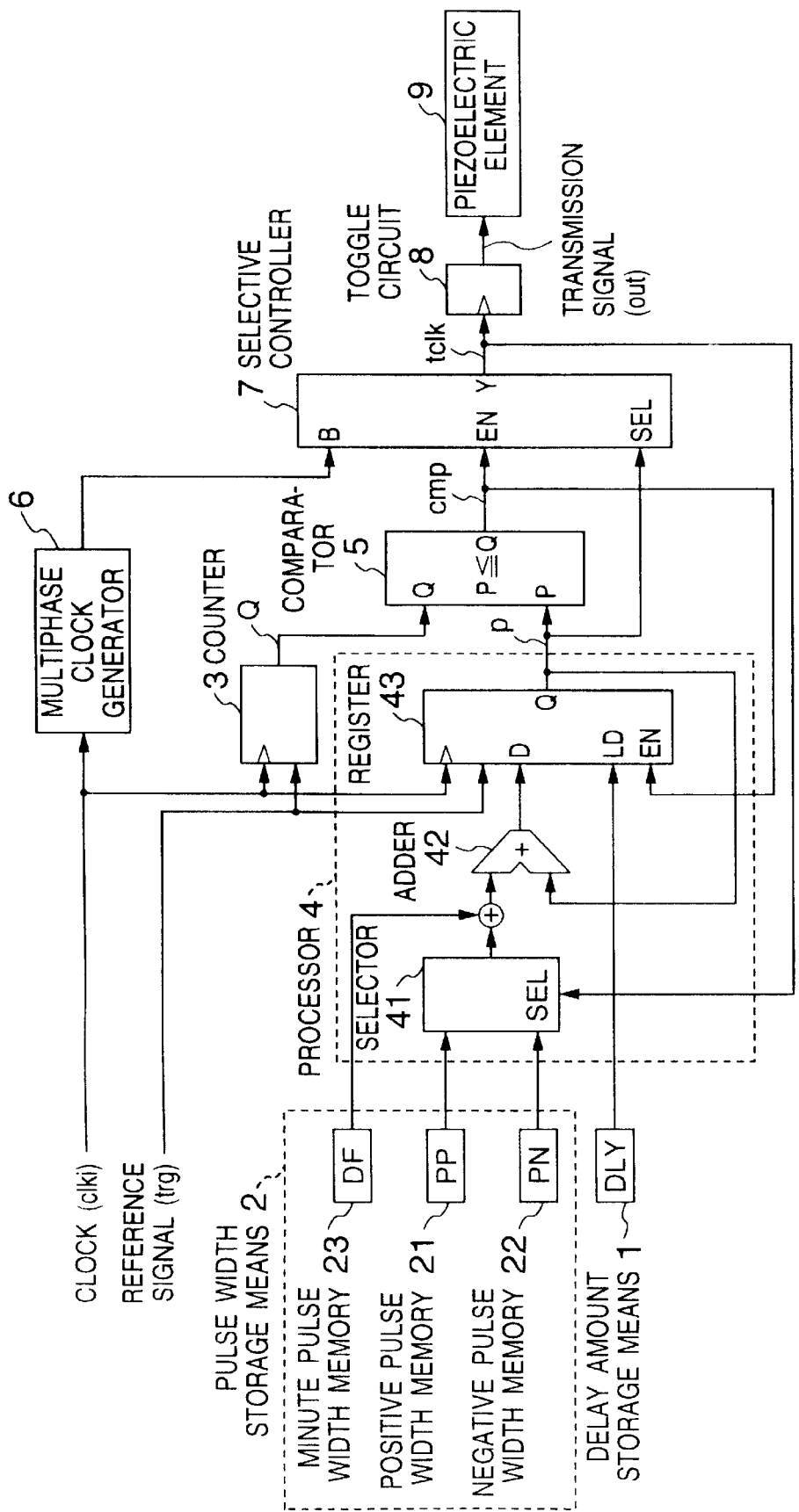
FIG. 1 is a block diagram showing a configuration of an ultrasonic wave diagnostic apparatus according to a first embodiment of the invention.

FIG. 1 is a block diagram showing a configuration of an ultrasonic wave diagnostic apparatus according to a first embodiment. In FIG. 1, reference numeral 1 designates a delay amount storage means for storing the delay amount to control the phase of the transmission signal for each piezoelectric element, and numeral 2 a pulse width memory for storing the pulse width to control the frequency of the transmission signal for each piezoelectric element. The pulse width storage means 2 includes a positive pulse width memory 21, a negative pulse width memory 22 and a minute pulse width memory 23. Numeral 3 designates a counter for counting the time elapsed from a reference time point by means of a clock signal.

Numeral 4 designates a processor for calculating a change point of the transmission signal from a reference point. The processor 4 includes a selector 41 for selecting a memory unit of the pulse width storage means 2, an adder 42 and a register 43. Numeral 5 designates a comparator for comparing the output of the counter 3 with that of the processor 4, and numeral 6 a multiphase clock generator for generating a plurality of clock signals having different phases. Numeral 7 designates a selective controller for selectively controlling the clock signals generated from the multiphase clock generator 6. Numeral 8 designates a toggle circuit for generating the transmission pulse signal, and numeral 9 a piezoelectric element. The ultrasonic wave diagnostic apparatus comprises a plurality of the above-mentioned configurations, of which only one will be explained below for facilitating the understanding.

Figure 2:
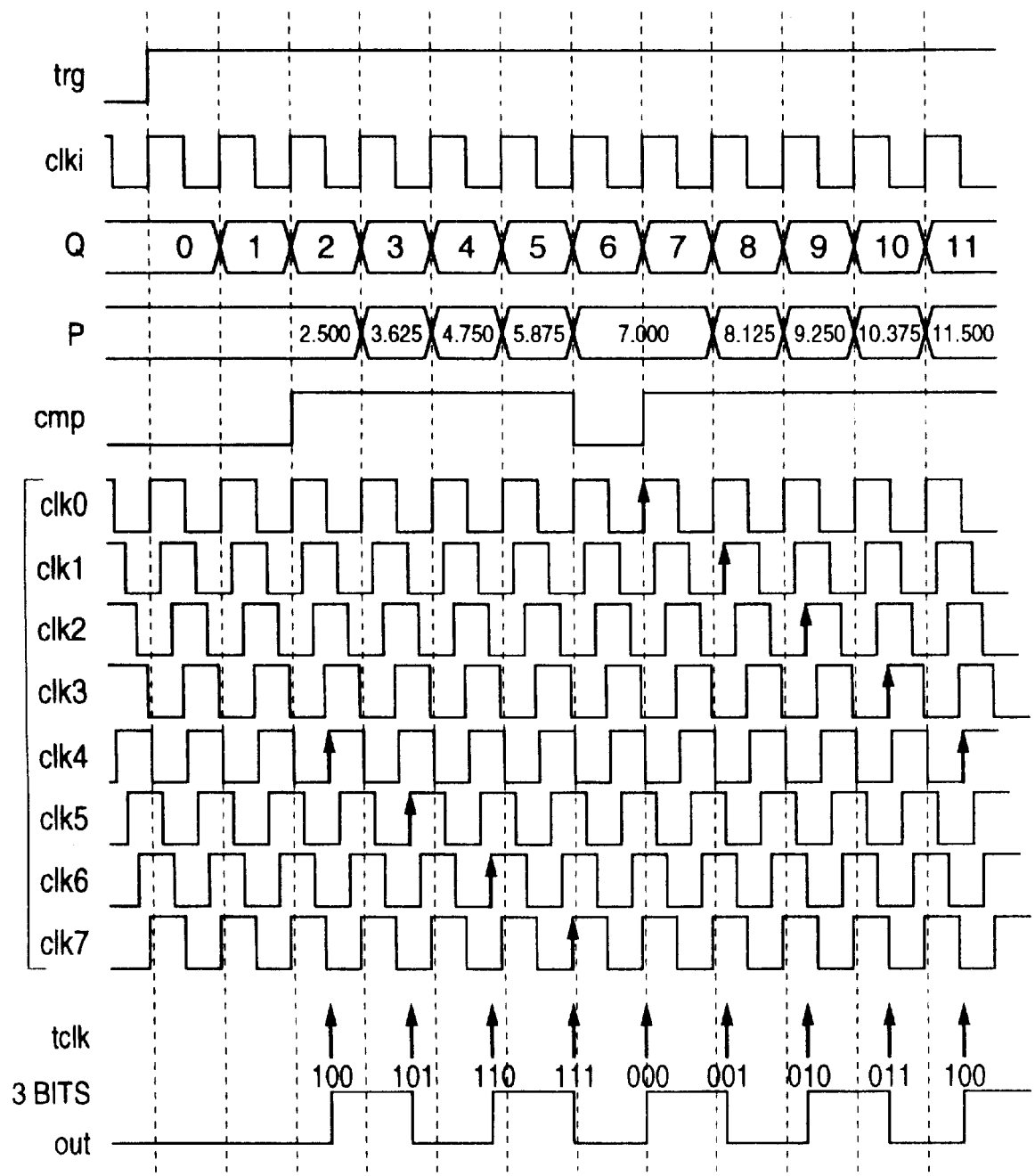
FIG. 2 is a timing chart representing the operation of the apparatus shown in FIG. 1.

The operation of the ultrasonic wave diagnostic apparatus having the above-mentioned configuration according to the present embodiment will be explained with reference to the timing chart of FIG. 2. According to this embodiment, decimal places (three low-order bits) of the output value P of the processor 4 are used for the selection signal for the selective controller 7. FIG. 2 shows the three low-order bits of the output of the processor 4.

Eight clock signals including clk0 to clk7 are generated in the multiphase clock generator 6 in FIG. 1, as shown in FIG. 2. The phase difference is equal between clk0 and clk1, between clk1 and clk2, between clk2 and clk3, . . . , and between clk7 and clk0. Also, the value of the delay amount storage means 1 is 2.500, the value of the pulse width storage means 2 is 1.125 for the positive pulse width memory 21, 1.125 for the negative pulse width memory 22 and 0.0 for the minute pulse width memory 23.

The value of the delay amount storage means 1 (2.500 in the case of FIG. 2) is set in the internal register 43 of the processor 4. In response to a reference signal trg representing a reference time point, the counter 3 begins to operate. The counter 3 and the processor 4 are adapted to operate in response to the output clk0 of the multiphase clock generator 6. The output value Q of the counter 3 and an integral part of the output value P of the processor 4 are compared with each other in the comparator 5. In the case where the output value Q of the counter 3 is larger than the output value P of the processor 4, the output cmp of the comparator 5 becomes active. When this cmp signal is active, the selective controller 7 selectively outputs one of the clock signals clk0 to clk7 having different phases constituting the output signal of the multiphase clock generator 6.

The signal for selecting a clock signal is a decimal (low-order) part of the output value P of the processor 4. In the example shown in FIG. 2, when the output value Q of the counter 3 assumes 2, the output signal cmp of the comparator 5 becomes active. In the process, the decimal part of the output value P of the processor 4 is 0.5 in decimal representation. The three bits representing the decimal part of the output value P are "100 (B)" in binary representation which correspond to "4" in decimal representation. Therefore, a clock signal clk4 is selectively output by the selective controller 7 from a plurality of clock signals clk0 to clk7 having different phases.

The toggle circuit 8 is driven by the output clock signal tclk of the selective controller 7 thereby to reverse the transmission signal output from the toggle circuit 8. Also, in the case where the transmission signal is positive, the output of the positive width memory 21 is selected by the selector 41 and added in the adder 42 to an output P of the register 43. Upon application of the next clock signal to the register 43, the output value of the adder 42 is set in the register 43.

In the example shown in FIG. 2, the transmission signal "out", which is output at the timing of the clock signal clk4 output from the selective controller 7, is reversed from negative to positive. Then, a value 3.625 constituting the sum of the output value 2.500 of the processor 4 and the pulse width value 1.125 is set in the register 43 at the leading edge of the next clock pulse clk0.

In FIG. 2, since the output value Q of the counter 3 is 3, the output value P of the processor 4 is a value of 3.625, and therefore the output cmp of the comparator 5 becomes active. Since the three low-order bits of the output P represent "101 (B)" in binary representation and "5" in decimal notation, the selective controller 7 selects the clock signal clk5, so that the transmission signal "out" output at this timing of clk5 is reversed from positive to negative. A similar operation is repeated.

In FIG. 2, when the output value Q of the counter 3 is 6, the integral part of the output value P of the processor 4 is 7, and therefore the output signal cmp of the comparator 5 becomes deactivated. Since the output signal cmp is inactive, no clock signal is produced from the selective controller 7 so that the transmission signal output from the toggle circuit 8 fails to be reversed. At the same time, the inactivity of the enable signal for the register 43 made up of the output signal cmp of the comparator 5 keeps the output value of the register 43 unchanged.

An ultrasonic wave diagnostic apparatus of electronic focus type uses a plurality of piezoelectric elements for converging an ultrasonic wave beam. The circuit block shown in FIG. 1 is required for each of the piezoelectric elements. Assuming that different values are set for the plurality of piezoelectric elements in the minute pulse width memory 23 and added in the adder 42, the transmission pulse signal output from the toggle circuit 8 can be set to a frequency varying from one piezoelectric element to another.

As described above, the delay amount data for each piezoelectric element from the delay amount storage means 1 for storing the delay amount is set in the internal register 43 of the processor 4, and the counter 3 for counting the time elapsed from a reference time point begins to operate in response to a reference signal input thereto. When the output of the counter 3 exceeds that of the register 43, the set delay time is considered to have passed, thereby activating the output of the comparator 5. When the output of the comparator 5 is active, one of the clock signals having different phases is selected by the selective controller 7 and drives the toggle circuit 8, with the result that the transmission signal makes a first reversal.

Upon generation of a clock signal for driving the toggle circuit 8, the sum of the output of the internal register 43 of the processor 4 and the value output from the pulse width storage means 2 are set in the register 4, and the output of the register 43 is compared with the output of the counter 3 in a similar manner to the above-mentioned case. When the output of the comparator 5 is active, the selected one of the clock signals drives the toggle circuit 8 thereby to make a second reversal of the transmission signal. This operation is repeated to generate a transmission signal.

The frequency of the transmission signal output from the toggle circuit 8 can be controlled by changing the value of the pulse width added in the processor 4.

Also, the duty factor of the transmission signal output from the toggle circuit 8 can be controlled by using different pulse width values between the rise and fall of the output of the toggle circuit 8.

Further, the frequency of the transmission signal can be finely controlled by setting in the minute pulse width memory 23 different values for respective piezoelectric elements as pulse width values to be added in the processor 4. The directivity of the ultrasonic wave beam depending on the deflection angle can thus be corrected.

(Embodiment 2)

Figure 3:
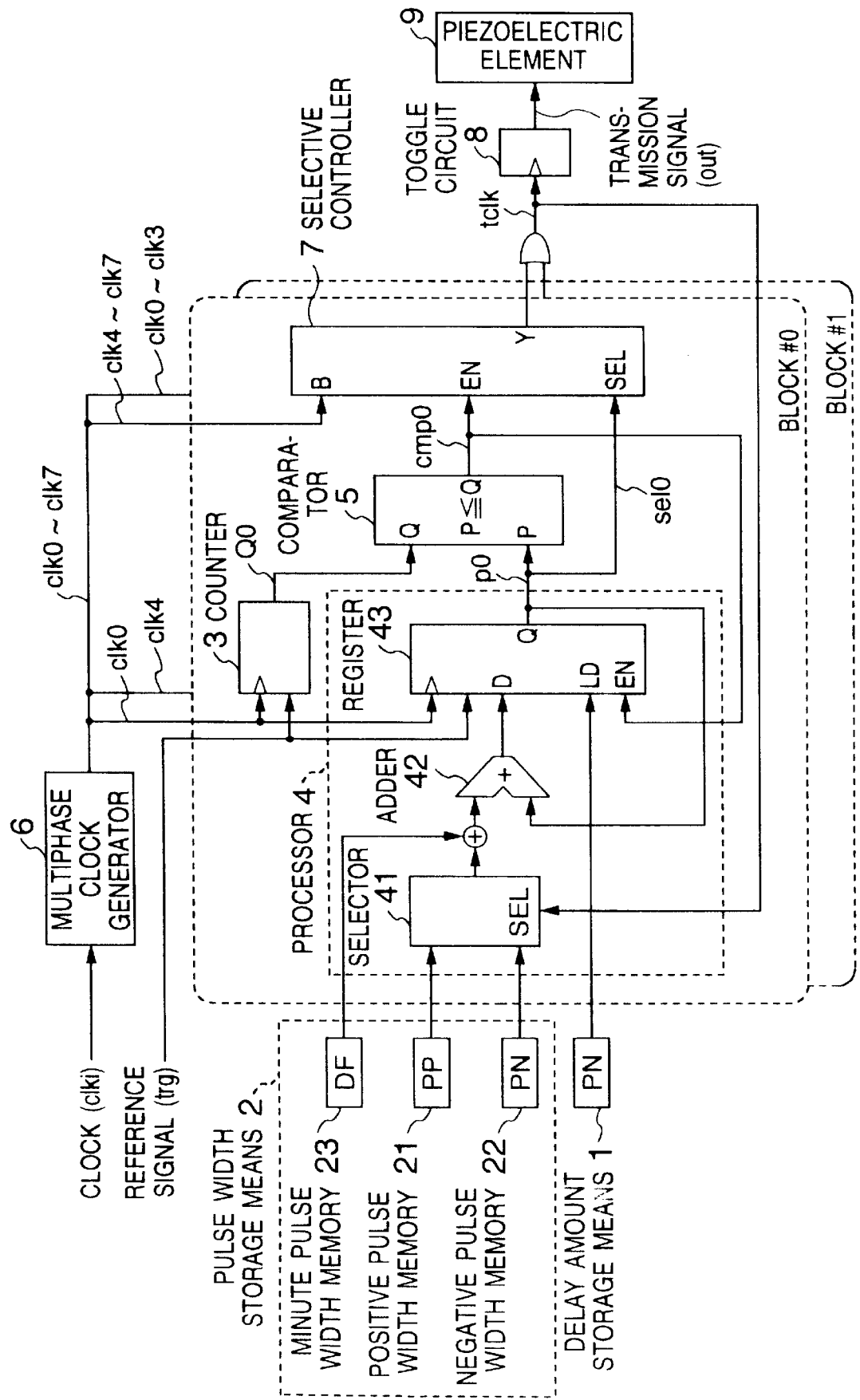
FIG. 3 is a block diagram showing a configuration of an ultrasonic wave diagnostic apparatus according to a second embodiment of the invention.

FIG. 3 is a block diagram showing a configuration of an ultrasonic wave diagnostic apparatus according to a second embodiment. In FIG. 3, the same component parts as the corresponding ones in the first embodiment are designated by the same reference numerals, respectively, and will not be described.

In FIG. 3, block #0 and block #1 have the same internal configuration. The counter 3 and the processor 4 of block #0 are driven by the output clk0 of the multiphase clock generator 6. The counter 3 and the processor 4 of block #1, on the other hand, are driven by the output clk4 of the multiphase clock generator 6. The selective controller 7 of block #0 selects one of the clock signals clk4 to clk7 having different phases, and the selective controller 7 of block #1 selects one of the clock signals clk0 to clk3 having different phases. Also, the clock signal tclk output from block #0 or #1 drives the toggle circuit 8. Further, the delay amount storage means 1, the pulse width storage means 2 and the multiphase clock generator 6 are shared by block #0 and block #1.

Figure 4:
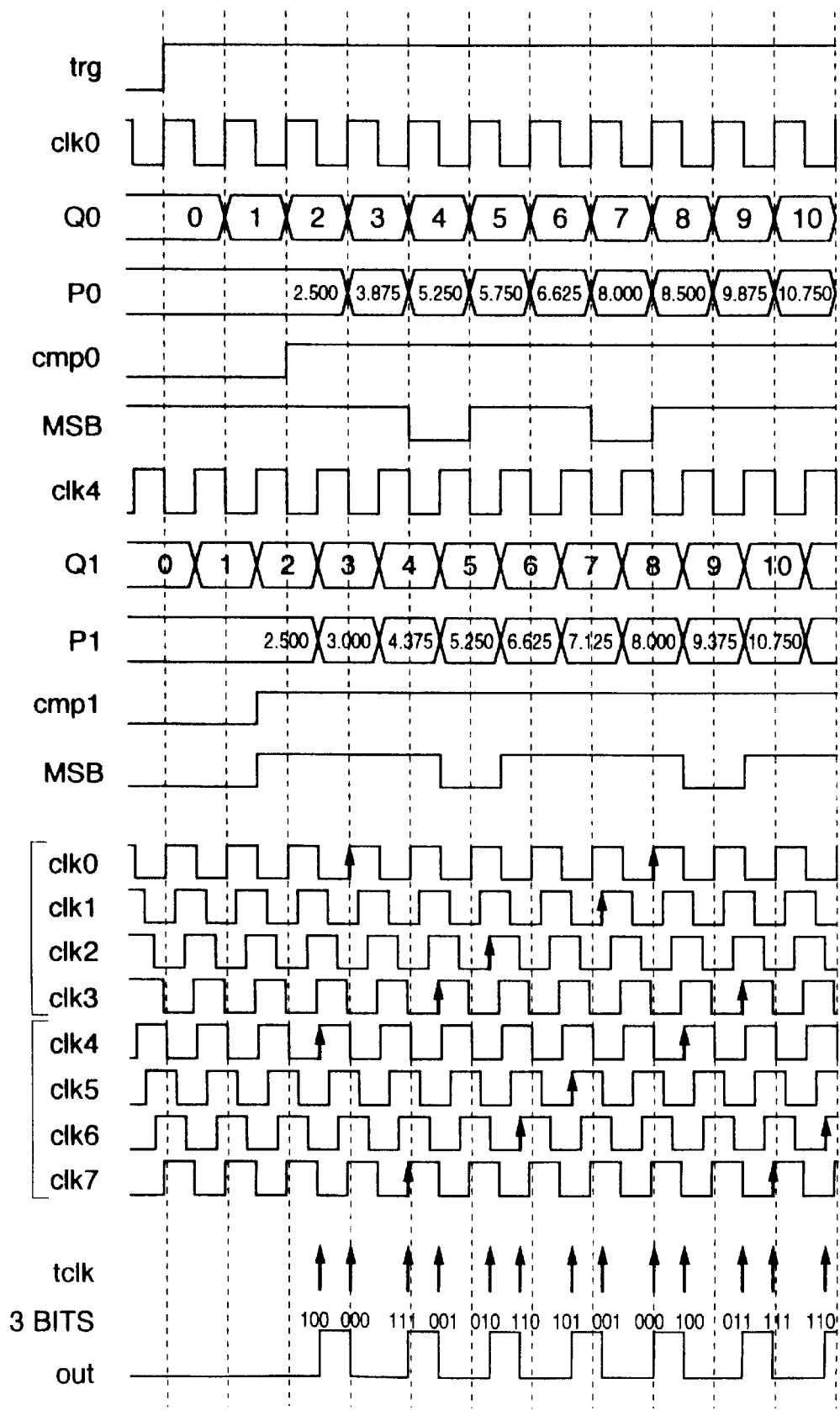
FIG. 4 is a timing chart representing the operation of the apparatus shown in FIG. 3.
Figure 5:
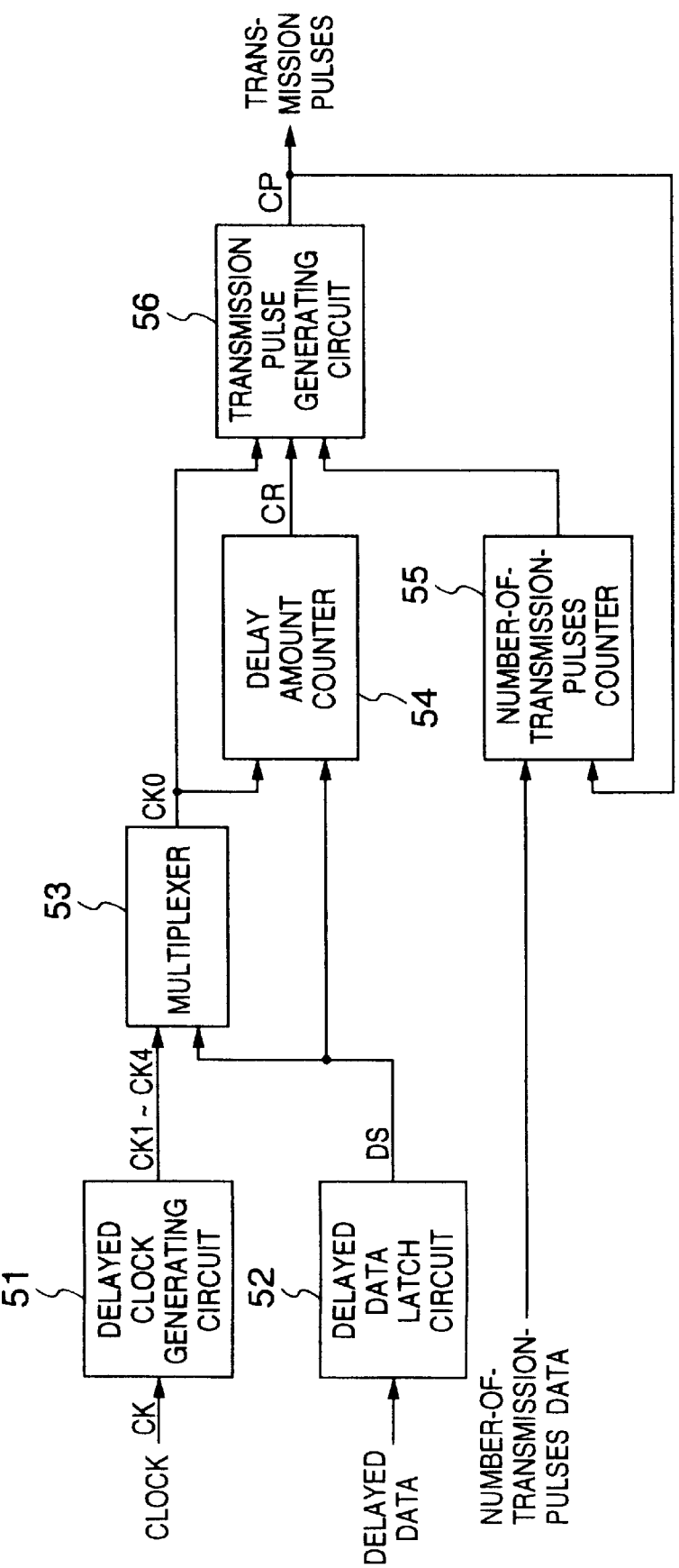
FIG. 5 is a block diagram showing a configuration of a conventional ultrasonic wave diagnostic apparatus.

FIG. 4 is a timing chart showing the operation according to this embodiment. In this embodiment, a value stored in the delay amount storage means 1 is a value of 2.5 and has three bits below the decimal point. Eight clock signals clk0 to clk7 are generated from the multiphase clock generator 6, with the same phase difference between clk0 and clk1, between clk1 and clk2, between clk2 and clk3, . . . , between clk7 and clk0. Also, the pulse width storage means 2 stores a value of 0.5 for the positive pulse width memory 21, 0.875 for the negative pulse width memory 22 and 0.0 for the minute pulse width memory 23.

The value of the delay amount storage means 1 is set in the internal registers 43 of the processors 4 of blocks #0 and #1, respectively. In response to a reference signal trg input thereto, the counters 3 of blocks #0 and #1 begin to operate. In FIG. 4, when the value of the output Q1 of the counter 3 of block #1 is a value of 2, the output P1 of the register 43 of block #1 is a value of 2.5 and the output signal cmp1 of the comparator 5 becomes active. The three low-order bits of the output value P1 of the register 43 are "100 (B)" in binary representation and "4" in decimal notation. The clock signals having different phases supplied to the selective controller 7 of block #1, on the other hand, are clk0 to clk3. Therefore, no clock signal is generated from the selective controller 7 of block #1 and the transmission signal output from the toggle circuit 8 is not reversed.

Now, when the output Q0 of the counter 3 of block #0 is a value of 2, the output P0 of the register 43 of block #0 takes a value of 2.5, and therefore the output signal cmp0 of the comparator 5 becomes active. The three low-order bits of the output P0 of the register 43 represent "100 (B)" in binary representation and "4" in decimal representation. The clock signals of different phases applied to the selective controller 7 of block #0 are clk4 to clk7. Therefore, the transmission signal output from the toggle circuit 8 is reversed at the timing of clk4 output from the selective controller 7 of block #0.

Assume that the transmission signal is reversed from negative to positive values when the counter output value Q1 is 3. The output value P1 of the processor 4 of block #1 becomes a value of 3.0 after the positive pulse width value of 0.5 is added thereto. At the same time, the selective controller 7 of block #1 selects clk0 and the transmission signal is reversed from positive to negative.

When the counter output value Q0 is 3, the transmission signal is reversed from positive to negative. Therefore, the output value P0 of the processor 4 of block #0 becomes a value of 3.875 after the positive pulse width value of 0.875 is added thereto.

In the case where the transmission signal fails to reverse after the previous clock signal input, the enable signal for the register 43 is not active. Therefore, the output value P0 or P1 of the processor 4 remains unchanged. In the case where the transmission signal makes one reversal, the output value P0 or P1 of the processor 4 becomes a value after the value of the positive pulse width memory 21 or the negative pulse width memory 22 is added thereto. In the case where the transmission signal makes two reversals, the output value P0 or P1 of the processor 4 becomes a value after the values of both the positive pulse width memory 21 and the negative pulse width memory 22 are added thereto. A similar operation is repeated.

As described above, according to this embodiment, each block is operated with a different clock signal, so that two or more clock signals can be selected for driving the toggle circuit 8 during the one-clock signal period for the processor 4 and the counter 3. The frequency of the transmission signal thus can be increased more than the clock signal frequency.

It will thus be understood from the foregoing description that according to this invention, the count value on the counter for counting the time elapsed from a reference time point is compared with the delay amount for determining the timing of reversing the transmission signal output or with the sum of the delay amount and accumulated pulse widths, and in the case of coincidence between them, the transmission signal output is reversed. The invention has therefore the following effects.

(1) Since the apparatus according to the invention is configured of a digital circuit using pulse signals, a high accuracy and stabilized characteristics are obtained.

(2) Low-frequency clock signals can be used by setting the frequency of the transmission signal at a value higher than the operating clock signal, making it possible to further improve the accuracy and stability of the characteristics.

(3) The duty factor and the frequency of the transmission signal pulses can be set in an arbitrary minimum unit, and therefore a high-quality image is produced.

(4) In view of the fact that the frequency of the transmission signal can be controlled for each direction in which the ultrasonic beam is converged to correct the directivity of the beam in accordance with the deflection angle, the quality of the image is further improved.

(5) The delay amount and the frequency of the transmission signal can be controlled by a single digital circuit, and therefore the apparatus can be further reduced in size and cost.

We claim:

1. An ultrasonic wave diagnostic apparatus comprising:

a plurality of piezoelectric elements each supplied with a transmission signal for generating an ultrasonic wave;

delay amount storage means for storing a delay amount for controlling a phase of said transmission signal for respective ones of said piezoelectric elements;

pulse width storage means for storing a pulse width for controlling a frequency of said transmission signal for respective ones of said piezoelectric elements;

measurement means for receiving a reference time signal representing a reference time point and measuring a time elapsed from the reference time point;

calculation means for determining a change point of said transmission signal in accordance with the delay amount stored in said delay amount storage means, the pulse width stored in said pulse width storage means and said reference time signal;

a comparator for comparing an output of said calculation means with an output of said measurement means;

a multiphase clock signal generator for generating a plurality of clock signals having different phases;

selection means for selecting one of said plurality of clock signals generated by said multiphase clock generator in accordance with the output of said calculation means in a case where an output of said comparator exhibits a predetermined state; and a circuit for generating said transmission signal in accordance with said one of said plurality of clock signals selected by said selection means.

2. An ultrasonic wave diagnostic apparatus according to claim 1, wherein:

said pulse width storage means stores the pulse width for controlling the frequency of said transmission signal for each direction in which the ultrasonic wave is converged.

3. An ultrasonic wave diagnostic apparatus according to claim 1, wherein:

said output of said calculation means comprises numerical data including an integral portion and a fractional portion, and said selection means selects said one of said clock signals in accordance with the fractional portion of said numerical data output from said calculation means.

4. An ultrasonic wave diagnostic apparatus comprising:

a plurality of piezoelectric elements each supplied with a transmission signal for generating an ultrasonic wave;

delay amount storage means for storing a delay amount for controlling a phase of said transmission signal;

pulse width storage means for storing at least one pulse width for controlling a frequency of said transmission signal;

a plurality of measurement means each for receiving a reference time signal representing a reference time point and measuring a time elapsed from the reference time point;

a plurality of calculation means for respectively determining a plurality of change points of said transmission signal in accordance with the delay amount stored in said delay amount storage means, the at least one pulse width stored in said pulse width storage means and said reference time signal;

a plurality of comparing means for respectively comparing outputs of said calculation means with outputs of said measurement means;

a multiphase clock signal generator for generating a plurality of clock signals having different phases;

a plurality of selection means for respectively selecting ones of said plurality of clock signals generated by said multiphase clock generator in accordance with the outputs of said plurality of calculation means and outputs of said plurality of comparing means; and transmission signal generating means for generating said transmission signal in accordance with ones of said plurality of clock signals selected by said plurality of selection means;

wherein said transmission signal has a frequency not lower than a frequency of each of said plurality of clock signals generated by said multiphase clock generator.

* * * * *